(12) United States Patent
Antunovic et al.

(10) Patent No.: US 11,869,230 B2
(45) Date of Patent: Jan. 9, 2024

(54) JOINT FORECASTING OF FEATURE AND FEATURE MOTION

(71) Applicant: Rimac Automobiles Ltd., Sveta Nedelja (HR)

(72) Inventors: Tonci Antunovic, Split (HR); Marin Orsic, Zapresic (HR); Josip Saric, Zagreb (HR); Sinisa Segvic, Zagreb (HR); Sacha Vrazic, Zagreb (HR)

(73) Assignee: RIMAC AUTOMOBILES LTD., Sveta Nedelja (HR)

( * ) Notice: Subject to any disclaimer, the term of this patent is extended or adjusted under 35 U.S.C. 154(b) by 210 days.

(21) Appl. No.: 17/339,731

(22) Filed: Jun. 4, 2021

(65) Prior Publication Data

US 2022/0180133 A1 Jun. 9, 2022

(30) Foreign Application Priority Data

Dec. 7, 2020 (DE) ..................... 20 2020 107 031.2

(51) Int. Cl.
*G06V 10/82* (2022.01)
*G06N 3/02* (2006.01)
(Continued)

(52) U.S. Cl.
CPC ............. *G06V 10/82* (2022.01); *G06N 3/02* (2013.01); *G06T 3/0093* (2013.01);
(Continued)

(58) Field of Classification Search
CPC ...... G06V 10/82; G06V 10/70; G06V 10/454; G06V 10/7715; G06V 10/10; G06V 10/20; G06V 10/806; G06V 30/274; G06V 30/262; G06V 10/768; G06V 30/10; G06V 30/268; G06V 10/424; G06V 30/18171; G06V 20/70; G06V 20/00; G06V 20/56; G06V 20/50; G06V 20/54; G06V 20/582; G06V 20/584; G06V 20/586; G06V 20/58; G06N 3/02; G06N 3/0464; G06N 3/04;
(Continued)

(56) References Cited

PUBLICATIONS

Fayyaz et al; "STFCN: spatio-temporal fully convolutional neural network for semantic segmentation of street scenes"; Computer Vision—ACCV 2016 Workshops: ACCV 2016 International Workshops, Taipei, Taiwan, Nov. 20-24, 2016, Revised Selected Papers, Part I 13; Springer International Publishing (Year: 2017).*

(Continued)

*Primary Examiner* — Sumati Lefkowitz
*Assistant Examiner* — Michael Adam Shariff
(74) *Attorney, Agent, or Firm* — Seed IP Law Group LLP (57) ABSTRACT

A computer-implemented method of forecasting the semantic output of at least one frame, the method comprising the steps of receiving the input frames from a camera up to a predetermined time, processing via a down-sampling module of a neural network the plurality of input frames to receive a plurality of feature tensors, determining spatio-temporal correlations between the plurality of feature tensors, processing the plurality of feature tensors and the spatio-temporal correlations to receive at least one forecasted feature tensor, and processing via an up-sampling module of the neural network the at least one forecasted feature to receive at least one forecasted semantic output for a time larger than the predetermined time.

13 Claims, 7 Drawing Sheets

(51) Int. Cl.
  *G06V 20/56* (2022.01)
  *G06V 30/262* (2022.01)
  *G06T 3/00* (2006.01)
  *G06T 3/40* (2006.01)
  *G06V 30/19* (2022.01)

(52) U.S. Cl.
  CPC ............ *G06T 3/4046* (2013.01); *G06V 20/56* (2022.01); *G06V 30/19173* (2022.01); *G06V 30/274* (2022.01)

(58) Field of Classification Search
  CPC .................. G06N 20/00; G06T 3/4046; G06T 2207/20084; G06T 7/33; G06T 7/20; G06T 2207/30232; G06T 2207/30248; G06T 2207/30252; G06T 2207/30256; G06T 2207/30261; G06T 3/0093; G06F 18/00; G06F 18/213; G06F 18/2132; G06F 18/21322; G06F 18/21324; G06F 18/21326; G06F 18/21328; G06F 18/2133; G06F 18/2134; G06F 18/21342; G06F 18/21343; G06F 18/21345; G06F 18/21347; G06F 18/21348; G06F 18/2135; G06F 18/21355; G06F 18/2136; G06F 18/2137; G06F 18/21375; G06F 18/253; G06F 18/24; G06F 18/241; G06F 18/2411; G06F 18/2413; G06F 18/24133; G06F 18/24137; G06F 18/2414; G06F 18/24143; G06F 18/24147; G06F 18/2415; G06F 18/24155; G06F 18/243; G06F 18/2431; G06F 18/24317; G06F 18/24323; G06F 18/2433; G06F 18/245; G06F 18/2451; G06F 18/2453; G08G 1/166; G08G 1/16; G08G 1/00; B60W 60/00; B60W 60/001; B60W 60/0027
  See application file for complete search history.

(56) References Cited

PUBLICATIONS

Šarić et al.; "Single level feature-to-feature forecasting with deformable convolutions"; Pattern Recognition: 41st DAGM German Conference, DAGM GCPR 2019, Dortmund, Germany, Sep. 10-13, 2019, Proceedings 41; Springer International Publishing (Year: 2019).*

Guarino et al.; "Temporal information integration for video semantic segmentation." 2020 IEEE International Conference on Robotics and Automation (ICRA); IEEE (Year: 2020).*

Šarić et al., "Warp to the Future: Joint Forecasting of Features and Feature Motion," *IEEE Xplore*, 10648-10657, 2020.

* cited by examiner

JOINT FORECASTING OF FEATURE AND FEATURE MOTION

TECHNICAL FIELD

The present invention relates to an apparatus configured to forecast the semantic output of at least one frame, a vehicle component configured to forecast the semantic output of at least one frame, and a method of forecasting the semantic output of at least one frame.

TECHNICAL BACKGROUND

Anticipated future is invaluable input to many decision making systems. For example, in autonomous driving, future pedestrian location could enable potentially life-saving decisions. Models for forecasting future events can often be trained on unlabeled videos, which are an inexhaustible source of training data. A straight-forward approach to forecasting in video would target future RGB frames. However, this difficult task is not required in many interesting applications. For instance, in the autonomous driving context, we are more concerned about future semantics than about future appearance.

Note that there are three computer vision task which are suitable for extracting semantics from images of natural scenes: i) semantic segmentation, ii) instance segmentation, and iii) panoptic segmentation. Semantic segmentation assigns each pixel to a suitable semantic class such as road or car. Instance segmentation detects instances of object classes and associates them with the respective image regions. Panoptic segmentation is the most advanced task for scene understanding. It assigns each pixel the semantic class and the index of the respective instance. The presented method is applicable to all three tasks.

In the context of computer vision, segmentation means attempting to only group together pixels which represent the same object or the same class of objects (for example, understanding that pixels of a person belong to the same object, but not understanding that this object/class is a car or person or road, or even having any knowledge about cars or people (or any category) that might appear in the dataset). Semantic segmentation additionally requires the exact class to be predicted as well. Hence, semantic forecasting represents an interesting alternative with clear potential to improve accuracy and speed.

Several approaches have been proposed for future anticipation on the semantic level. Direct semantic forecasting maps past predictions into future ones. Unfortunately, this approach risks propagating single-frame prediction errors into the forecast. Additionally, successful forecasting requires establishing correspondence across the past frames, which is not easily achieved at the level of final predictions. Finally, this approach cannot be realized in a task agnostic manner.

Flow-based forecasting operates on dense image motion vectors. It receives reconstructed optical flow from the past frames and targets the optical flow between the future frame and the last observed frame. Future predictions can be recovered by warping past predictions with the forecasted flow. However, this approach requires pre-computed optical flow, which implies separate training and decreases inference speed. Additionally, purely geometric forecasting cannot take advantage of semantic information and generate ad-hoc content in disoccluded pixels.

Feature-level forecasting receives intermediate feature tensors from the past frames and targets their future counterparts. In comparison with the previous two approaches, feature-level forecasting stands a better chance to avoid propagating single-frame prediction errors, since feature tensors are not constrained to commit to particular predictions. Additionally, deep convolutional representations are typically subsampled with respect to input which allows for efficient implementations in terms of memory footprint and computational speed. There is also a promising potential for end-to-end training and task-agnostic operation.

However, most previous feature-level approaches express forecasting as a pure recognition task. This does not appear satisfactory since it ignores the geometric nature of future anticipation and makes it difficult for the model to disentangle factors of variation such as camera motion, depth, and independent object motion.

Feature-level forecasting can also be expressed as a pure 3D reconstruction task given reconstructed ego-motion and depth. However, 3D interpretation may introduce undesired noise, while perhaps not being necessary for achieving optimal performance. This especially concerns the process of "imagining" unobserved scenery. Hence, it is preferable to formulate the forecast as 2D motion of previously observed structure plus 2D generation of novel scenery.

SUMMARY

The above problems are solved by the subject-matter of the independent claims. Further preferred embodiments are given by the subject-matter of the dependent claims.

The present invention is based on the understanding that learning and inference can be easier if some factors of variation were explicitly present in the model.

The present invention expresses feature-level forecasting by disentangling variation caused by motion from variation due to novelty. In some embodiments of the present invention, feature-based forecasting can be improved by enriching feature tensors with their spatio-temporal correlation coefficients across the local neighborhood. This promotes generalization across semantic classes and simplifies establishing temporal correspondence. Further, some embodiments of the present invention express variation due to motion by warping observed feature tensors with regressed feature flow. This procedure is denoted as F2M (feature-to-motion) forecasting in order to emphasize its relation towards the F2F (feature-to-feature) approach. Third, in some embodiments, the complementary nature of F2F and F2M approaches are leveraged by blending their forecasts according to densely regressed weight factors. The proposed F2MF forecasting model shows advantageous performance in the short-term and the mid-term period compared to the classic F2F approach by improving the accuracy in previously observed regions and encouraging the F2F module to focus on "imagining" the novel scenery. F2M forecast can be implemented either with forward or backward warping.

According to an embodiment of the present invention, there is provided a computer-implemented method of forecasting the semantic output of at least one frame, the method comprising the steps of: receiving the input frames from a camera up to a predetermined time, processing via a down-sampling module of a neural network the plurality of input frames to receive a plurality of feature tensors, determining spatio-temporal correlations between the plurality of feature tensors, processing the plurality of feature tensors and the spatio-temporal correlations to receive at least one forecasted feature tensor, and processing via an up-sampling module of the neural network the at least one forecasted feature to receive at least one forecasted semantic output for a time larger than the predetermined time.

According to an embodiment of the present invention, there is provided an apparatus configured for executing a method for forecasting the semantic output of at least one frame, the method comprising the steps of: receiving the input frame from a camera up to a predetermined time, processing via a down-sampling module of a neural network the plurality of input frames to receive plurality of feature tensors, determining spatio-temporal correlations between the plurality of feature tensors, processing the plurality of feature tensors and the spatio-temporal correlations to receive at least one forecasted feature tensor, and processing via an up-sampling module of the neural network the at least one forecasted feature to receive at least one forecasted semantic output for a time larger than the predetermined time.

According to an embodiment of the present invention, there is provided a vehicle component comprising a processor and a memory, the memory having access to instruction that when provided to the processor, causes the processor to execute a method of forecasting the semantic output of at least one frame, the method comprising the steps of: receiving the input frames from a camera up to a predetermined time, processing via a down-sampling module of a neural network the plurality of input frames to receive a plurality of feature tensors, determining spatio-temporal correlations between the plurality of feature tensors, processing the plurality of feature tensors and the spatio-temporal correlations to receive at least one forecasted feature tensor, and processing via an up-sampling module of the neural network the at least one forecasted feature tensor to receive at least one forecasted semantic output for a time larger than the predetermined time.

According to an embodiment of the present invention, there is provided a vehicle component comprising a processor and a memory, the memory having access to instruction that when provided to the processor, causes the processor to simultaneously execute the methods for single-frame prediction and dense semantic forecasting of at least one future frame. The single-frame prediction method comprises the steps of: receiving the input frame from a camera, processing the input frame via a down-sampling module of a neural network to receive the corresponding feature tensor, caching the feature tensors for later use, and processing the feature tensor via an up-sampling module of the neural network to receive the semantic output. The dense semantic forecasting method comprises the steps of: retrieving a plurality of cached feature tensors, determining spatio-temporal correlations between the plurality of feature tensors, processing the plurality of feature tensors and the spatio-temporal correlations to receive at least one forecasted feature tensor, and processing via an up-sampling module of the neural network the at least one forecasted feature to receive at least one forecasted semantic output for a time larger than the predetermined time.

A notable advantage of the present invention is that the herein described forecasting methods require very little additional computational effort compared to the conventional dense prediction in the present frame. In detail, the additional steps of processing the down-sampled feature tensors require very little computational effort compared to the rest of the processing steps. Thus, the present invention is suitable for real-time implementations.

A further advantage of the present invention is that the herein described methods, of forecasting require very little additional computational effort compared to conventional methods. In detail, the additional steps of processing the down-sampled feature tensors require very little computational effort compared to the rest of the processing steps. Thus, the present invention is suitable for real-time implementations.

Central aspects of some of the proposed methods herein may be i) dense semantic forecasting, ii) joint forecasting of features and feature motion, and iii) distinguishing previously observed parts of the scene from novel scenery.

In further detail, anticipation of future semantics is a prerequisite for intelligent planning of current actions. Recent work addresses this problem by implicitly capturing laws of scene dynamics throughout deep learning in video. However, the existing approaches are unable to distinguish disoccluded and emerging scenery from previously observed parts of the scene. This is clearly suboptimal, since the former requires pure recognition while the latter can be explained by warping. Different than all previous approaches, our method is able to predict emergence of unobserved scenery, and to exploit that information for disentangling variation caused by novelty and variation due to motion.

The methods discussed herein perform dense semantic forecasting on the feature level. Different than conventional approaches, the forecasting process is regularized by expressing it as a causal relationship between the past and the future. The proposed F2M (feature-to-motion) forecasting generalizes better than the classic F2F (feature-to-feature) approach at many image locations. The best of both worlds is achieved by blending F2M and F2F predictions with densely regressed weight factors. The resulting F2MF approach surpasses the state-of-the-art in semantic segmentation forecasting on the Cityscapes dataset by a wide margin.

Convolutional features are complemented with their respective correlation coefficients organized within a cost volume over a small set of discrete displacements Our forecasting models use deformable convolutions in order to account for geometric nature of F2F forecasting. These two improvements bring clear advantage in all three feature-level approaches: F2F, F2M, and F2MF. To the best of our knowledge, this is the first account of using these improvements for semantic forecasting.

The proposed F2MF method is evaluated on two additional dense prediction tasks: instance segmentation and panoptic segmentation. These experiments use third party single-frame models and therefore show that our method can be successfully used as a drop-in solution for converting any kind of dense prediction model into its competitive forecasting counterpart.

The methods discussed herein may also be to multi-modal futures, which is a key to long-term forecasting and worst-case reasoning in real-world applications. Other suitable extensions include overcoming obstacles towards end-to-end training, extension to RGB forecasting, as well as enforcing temporally consistent predictions in neighbouring video frames.

BRIEF DESCRIPTION OF THE DRAWINGS

Embodiments of the present invention, which are presented for better understanding the inventive concepts, but which are not to be seen as limiting the invention, will now be described with reference to the figures in which.

DETAILED DESCRIPTION

Figure 1:
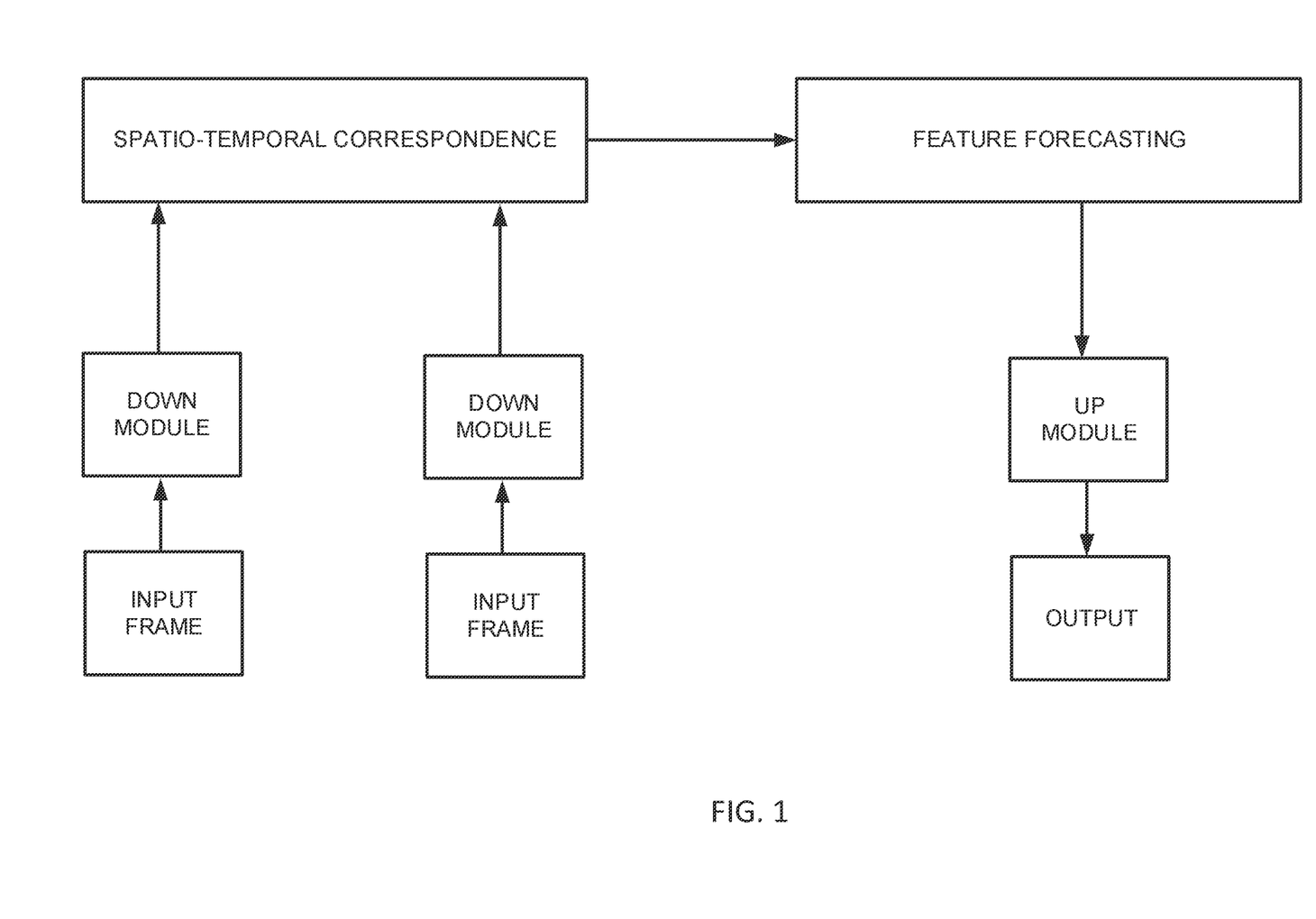
FIG. 1 shows a schematic view of the forecasting approach according to an embodiment of the present invention.

FIG. 1 shows a schematic view of the forecasting approach that is implemented as a compound convolutional neural network (CNN). The input of the forecasting approach is a plurality of input frames.

These input frames are each processed by a convolutional recognition module that processes input frames into down-sampled feature tensors. The resolution of the recovered feature tensors is heavily reduced with respect to the resolution of the input frames. This allows for efficient recovery of spatio-temporal correspondence even when the input resolution is in the megapixel range.

A CNN is a class of deep neural networks, most commonly applied to analyzing visual imagery. Sometimes, they are also known as shift invariant or space invariant artificial neural networks (SIANN), based on their shared-weights architecture and translation invariance characteristics. CNNs are regularized versions of multilayer perceptrons. Multilayer perceptrons usually mean fully connected networks, that is, each neuron in one layer is connected to all neurons in the next layer. Convolutional networks were inspired by biological processes in that the connectivity pattern between neurons resembles the organization of the animal visual cortex. Individual cortical neurons respond to stimuli only in a restricted region of the visual field known as the receptive field. The receptive fields of different neurons partially overlap such that they cover the entire visual field. CNNs use relatively little pre-processing compared to other image classification algorithms. This means that the network learns the filters that in traditional algorithms were hand-engineered. This independence from prior knowledge and human effort in feature design is a major advantage.

Based on the down-sampled feature tensors, a spatio-temporal correspondence between the feature tensors is established and in a next step, the forecasted feature tensors are inferred on the basis of the spatio-temporal correspondence of the feature tensors.

By including the spatio-temporal correspondence, that is, spatial correlations as well as temporal correlations, i.e. correlations over space and time, between the plurality of feature tensors, the performance of the forecasting can be improved compared to conventional techniques that do not make use of this part.

Further, the forecasted feature tensors are up-sampled by another module of the CNN and output as an output. This output may be dense semantic predictions such as semantic segmentation, instance segmentation or panoptic segmentation. This type module of the CNN is also referred to as UP module.

This may be advantageous for the process of decision making, because semantic information is sufficient for many high-level tasks such as autonomous driving, while forecasting RGB frames may be computationally more expensive.

As regards the forecasting, several techniques are known in the state of the art. The historically first technique to forecast future semantic segmentation is called direct semantic forecasting. Therein, a semantics-to-semantics (S2S) approach is used. This model follows the direct forecasting approach by taking past segmentations on the input and producing the future segmentation on the output. However, the forecasting accuracy of known approaches based on this idea may be insufficient compared to other techniques. It is suggested that ease of correspondence and avoiding error propagation may be important for successful forecasting.

Another technique is flow-based forecasting. Direct semantic forecasting requires a lot of training data due to necessity to learn all motion patterns one by one. This has been improved by allowing the forecasting model to access geometric features which reflect 2D motion in the image plane. Further development of that idea brings us to flow-based forecasting which warps the last dense prediction according to forecasted optical flow as explained elsewhere in this document. This approach achieves reasonably well short-term forecasting accuracy. Their convolutional LSTM (Long Short Term Memory) model receives backward optical flows from three observed frames and produces the backward optical flow for the future frame. LSTM is a version of a recurrent neural network often used in models for problems in which input structure is sequential (typical examples are natural language processing problems in which words and letters come in a sequence). However, due to obvious sequential nature of this problem, one can use LSTM networks with image/frame input by first processing the input images with convolutional networks, hence Convolutional LSTM. Such formulation is related to the F2M module discussed herein, which also forecasts by warping with regressed flow. However, the F2M module operates on abstract convolutional features, and requires neither external components nor additional supervision. This is achieved by joint training of our compound deep model with feature regression loss. This implies very efficient inference due to subsampled resolution and discourages error propagation due to end-to-end training. Additionally, feature tensors from past frames are taken into account instead of relying only on the last prediction. This allows the F2M module to detect complex disocclusion patterns and simply copy from the past where possible. Further, the module has access to raw semantic feature tensors which are complementary to flow patterns and often strongly correlated with future motion (consider for example cars vs pedestrians). Finally, we complement the F2M module with pure recognition-based F2F forecasting which outperforms F2M on previously unobserved scenery.

Optical flow has also been used for generating multi-modal future video from single-frame input; however, the F2M method described herein takes an opposite approach: we also forecast multiple flows, however our flows connect a single future frame with several past frames. Also multi-modal forecasting is feasible with the framework of the present disclosure.

Moreover, a relevant technique is feature-level forecasting. This approach maps past feature tensors to their future counterparts, which is also known as F2F (feature-to-feature) forecasting. A typical F2F approach operates on image-wide feature tensors from a fully connected layer. Alternatively, dense forecasting can be realized by regressing feature tensors along all levels of the up-sampling path. However, forecasting at fine resolution is computationally expensive hence some approaches revert to forecasting on the coarse feature level. State-of-the-art mid-term accuracy has been achieved by leveraging deformable convolutions in the F2F module, fine-tuning of the up-sampling path with cross-entropy, and a single-frame model. This model may be with or without skip-connections. Skip-connections can be understood as a feature according to which some of the layers of the neural network are skipped by the processing. In other words, the layers of the deep model can either operate exclusively on their immediate predecessors (no skip connections) or receive activations from some earlier layers via skip-connections. Forecasting at coarse resolution is advantageous due to small inter-frame displacements, rich contextual information, and small computational footprint, although some information for recovering small objects may be lost in the process.

The present invention contains the following advantages. First, the forecasting accuracy is improved by forecasting normalized feature tensors. In one embodiment these normalized feature tensors are SPP (Spatial Pyramid Pooling) feature tensors. SPP feature tensors are convolutional feature tensors at the output of the Spatial Pyramid Pooling module. Pyramid pooling module is typically found at the end of the down-sampling part (DN module), which "pools", that is, reduces the resolution of feature tensors by averaging local regions. This is done with varying sizes of local regions producing the feature tensors of different resolutions (hence pyramid). They are then up-sampled to feature tensors with a common resolution, concatenated, and used further in the convolutional network. Further, the proposed method and its F2F approach may be able to forecast at coarse resolution.

Second, the correspondence across neighboring feature tensors is explicitly modeled by recovering spatio-temporal correlations between convolutional feature tensors. Such geometric insight may further improve the forecasting accuracy. Third, F2M forecasting is introduced. This operates by warping previous feature tensors with regressed feature flow. The F2M and F2F approaches complement each other in a multi-head F2MF model with shared feature tensors. Further, F2F proves better in novel parts of the scene where the model has to imagine what will happen, while F2M prevails on previously observed scenery. This is related to formulating feature-level forecasting as reprojection of reconstructed feature tensors to the forecasted future ego-location. However, such purely geometric approach is clearly suboptimal in presence of (dis-)occlusions and changes of perspective. Additionally, it is difficult to account for independent motion of moving objects. A wide margin in improved performances underlines this and suggests that optimal forecasting performance requires a careful balance between reconstruction and recognition while explicit 3D reasoning may not be necessary.

Figure 2:
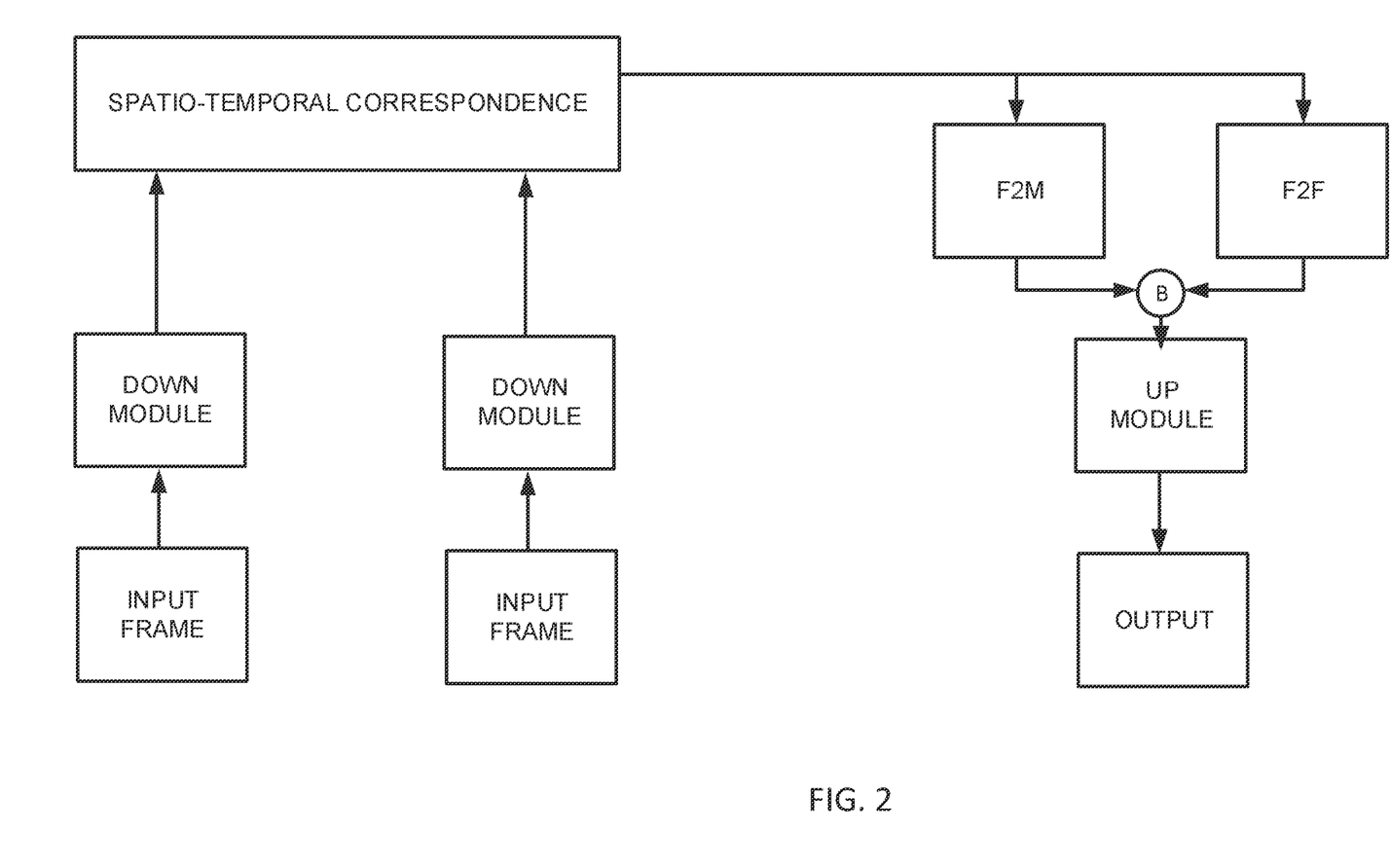
FIG. 2 shows a schematic view of the forecasting approach using both feature-to-feature (F2F) and feature-to-motion (F2M) according to an embodiment of the present invention.

FIG. 2 shows a schematic view of the forecasting approach using both feature-to-feature (F2F) and feature-to-motion (F2M). Compared to FIG. 1, there are more details of the step of inferring the forecasted feature present in FIG. 2. More concretely, FIG. 2 also shows the step of a plurality of input frames being down-sampled by DN modules into feature tensors, the step of establishing spatio-temporal correspondence between the feature tensors, the step of forecasting a feature based on the spatio-temporal correspondence, and the step of up-sampling the forecasted feature tensors by a UP module into asemantic output.

The step of forecasting is shown there in details as follows. In a first part of the forecasting, a step of feature-to-feature (F2F) forecasting is performed. In this step, the forecasted feature tensors are regressed from processed features from the observed frames, that is from the feature tensors obtained from down-sampling the input frames and optionally from the spatio-temporal correlations.

In a second part of the forecasting, a step of feature-to-motion (F2M) forecasting is performed. In this step, a regularized variant of the F2F forecasting is performed. This assumes that there is a causal relationship between past and future. Due to including the causal relationship between past and future, an improved performance can be achieved compared to F2F forecasting.

A possible implementation of this is warping, which is closely related to the concept of optical flow. Optical flow reconstructs dense two-dimensional (2D) motion between neighboring image frames $I_t$ and $I_{t+1}$. The flow can be defined either in the forward or in the backward direction. The future image $I_{t+1}$ can be approximated either by forward warping previous image $I_t$ with the forward flow $f_t^{t+1}$=flow $(I_t, I_{t+1})$, or by backward warping $I_t$ with the backward flow $f_{t+1}^t$=flow$(I_{t+1}, I_t)$:

$$I_{t+1} \approx \text{warp\_fw}(I_t, f_t^{t+1}) \approx \text{warp\_bw}(I_t, f_{t+1}^t)$$

Approximate equality in the above reminds us that a bijective mapping between two successive images often cannot be established due to (dis-)occlusions and changes of perspective.

In other words, (optical) flow for images is a way to specify the direction in which pixels are apparently moving from frame to frame. For example, a video from a still camera might capture a car moving to the right. In a frame, the pixels of this car are apparently moving to the right and their flow is to the right (flow also specifies the speed as well). Another car in the same frame might be moving to the left, and its pixels have flow to the left. The background pixels remain stationary from frame to frame and their flow is zero. Of course, the flow might be caused not just by moving of other objects, but also by moving the camera itself, or a combination. Alternatively, the optical flow may not be used directly on image pixels, but on the feature tensors inside convolutional neural network.

Further, warping is related to the optical flow, in the way that knowing the flow in the current (apparent moving pixels) one can paint-in the future frame which is not observed yet, by simply moving the pixels in the flow direction by the amount specified by the flow speed. This can be done by moving pixels and painting them in the right location in the future frame (forward warp), or by asking how to specifically paint every pixel in the future frame and moving in the negative flow direction to search for corresponding previous pixels (backward warp). Similar to the flow, this can be done either with the frame of an image or with a feature of a in a convolutional neural network.

Recent developments in optical flow research leverages deep convolutional models due to end-to-end trained correspondence and capability to guess motion in (dis-)occluded regions where correspondences are absent. These models are based on local embeddings which act as a correspondence metric, and explicit 2D motion recovery within the correlation layer. Note that correct flow-based forecasting requires optical flow estimation between the past and the future frame which is yet to be observed. Consequently, straightforward extrapolation of past optical flow is bound to achieve suboptimal accuracy even for short-term forecasting, especially at articulated objects such as pedestrians.

The results of the respective forecasting are then combined by a blend (B), resulting in one forecasted feature that is then subject to the up-sampling by the UP module, leading to the output.

Figure 3:
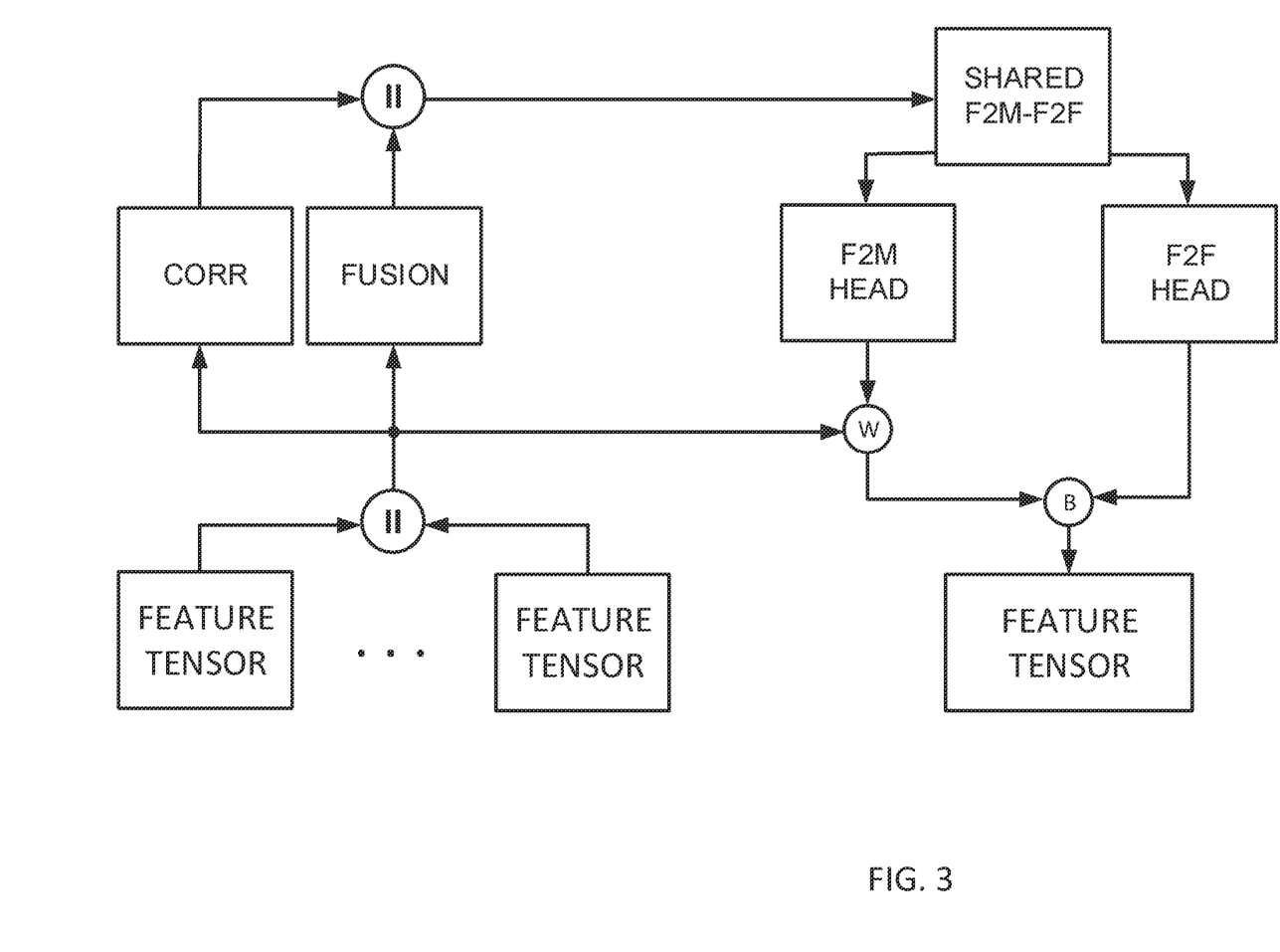
FIG. 3 shows further details of forecasting approach using F2MF according to an embodiment of the present invention.

FIG. 3 shows further details of the forecasting approach. In particular, it shows details of the determination of the spatio-temporal correlations. First, the plurality of feature tensors are concatenated. These concatenated feature tensors are then used for the various following steps. In a first step, the concatenated feature tensors are subject to a processing operation. Such an operation may be a fusion operation, which may be an operation in which the important information of the feature tensors are gathered and included into fewer feature tensors. The fusion operation may use a dedicated convolutional module. In a second step, the correlations of the concatenated features are calculated. The results of these steps are concatenated and represent the feature tensors combined with the spatio-temporal correlations that are provided as an input to the forecasting step. As discussed elsewhere in this document, this step of forecasting may employ F2F, F2M as well as a combination of both. In particular for F2M, the concatenated feature tensors are used in a warping procedure (W). Then, as already discussed in connection with FIG. 2, the results of the F2F approach and of the F2M approach are combined by means of a blend (B) to provide the forecasted feature tensor.

Spatio-temporal correlations may be determined by a corresponding module of the neural network. In detail, spatio-temporal correspondence is determined between neighboring feature tensors. In an example, on input, the neural network receives a tensor with convolutional feature tensors. The feature tensors from all time instants are embedded into a space with enhanced metric properties by a shared convolution. This mapping can recover distinguishing information which is not needed for single-frame inference. Subsequently, a metric embedding is constructed by normalizing feature tensor s to unit norm so that the cosine similarity becomes a dot product. Finally, correspondence maps between features at various times within a fixed neighborhood are produced.

Figure 4:
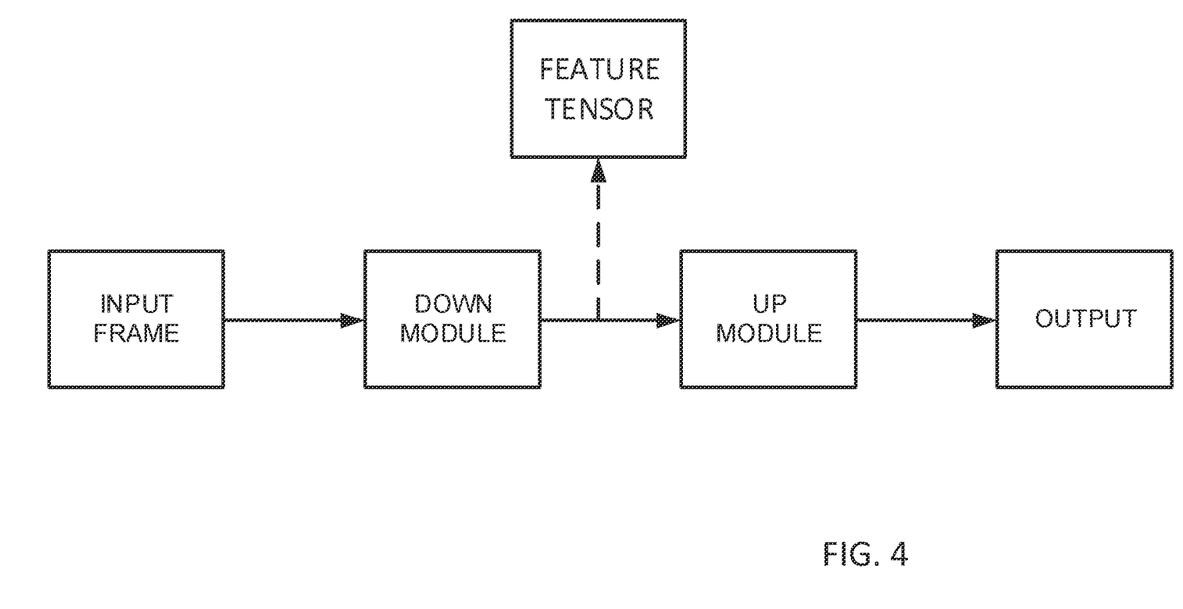
FIG. 4 shows a schematic view of the single frame model according to an embodiment of the present invention.

FIG. 4 shows a schematic view of the single frame model. Therein, it is shown that the DN module converts the input image into a feature tensor, also called a condensed representation. Similarly, the up-sampling by the UP module converts the condensed representation into a semantic output.

In the following, some more details of the forecasting are presented. The feature-to-feature network receives processed input feature tensors and directly regresses the future feature tensors. While this shares some similarities with conventional techniques, there is at least one important difference. The F2F network has access to spatio-temporal correlation feature tensors which relieve the need to learn correspondence from scratch. This leads to the advantage of these feature tensors regarding forecasting which in turn suggests that correspondence is not easily learned on existing datasets.

Another important difference between the present approach and conventional techniques is that this approach can perform the forecasting on heavily subsampled representations, e.g. up to 32 times subsampled representations. This simplifies establishing the spatio-temporal correspondence, thus reducing the computational effort.

The F2M module provides a regularized variant of F2F forecasting. It assumes that there is a causal relationship between the past and the future, which can be explained by 2D warping. It receives processed input feature tensors and outputs a dense displacement field for warping each of the feature tensors into its future counterpart. The forecasts are finally blended with regressed per-pixel weight vectors which use the softmax function as activation function. Consequently, the forecast can utilize the observed frame with the best view onto a disoccluded part of the scene.

There are at least two possibilities of F2M warping: Backward warping and forward warping. Backwarping requires backward feature flow in the future frame, while forward warping requires forward flow in the observed frame. Forward warping tends to be computationally much more intensive than backward warping, however, given the typical resolution, e.g. the subsampled resolution, is nevertheless feasible.

These two feature flows are quite different. The forward flow is aligned with the observed features, while the corresponding backward flow aligns with the forecasted features. Consider a pixel at some moving object in the last observed image. Its forward flow is inferred by looking (convolutionally speaking) at the present object location. On the other hand, the backward flow has to look at the future object location. Hence, backward flow requires larger receptive field in order to operate correctly. Backward F2M addresses effects of the motion: it makes decisions by considering all possible observed activations which may "come" into the particular location of the future tensor. Consequently, it stands a good chance to correctly resolve contention due to occlusion, provided its receptive field is large enough. On the other hand, forward F2M addresses the causes of the motion: it makes decisions by considering observed motion of feature activations. Hence, forward F2M is able to model a probabilistic distribution over feasible displacements, which may make it an interesting choice for longer-term forecasting of multi-modal future.

The compound F2MF model blends F2M and F2F outputs with densely regressed softmax activated weights. The F2MF model may reuse softmax preactivations of the F2M weight.

We note that F2M head may be preferred in static regions where establishing correspondence is relatively easy, while the F2F head contributes to dynamic scenery and assumes full responsibility in previously unobserved pixels. This suggests that F2F and F2M complement each other.

Finally, the compound model outperforms independent models even though its capacity is only marginally larger as most of F2F and F2M features are shared.

Moreover, generally it can be said that the two approaches, backward and forward warping, achieve very similar results in the standard setup. Hence, the use of the backward formulation as the more efficient option may be a valuable option. Alternative, forward warping may have an advantage in the case of limited receptive field, supporting the understanding that F2M with backward warp requires a larger receptive field. Taking these findings together, this fits with the understanding that the two approaches complement each other.

Regarding the feature normalization, it is noted that normalization improves the accuracy both, on short-term and mid-term period.

As regards a comparison between F2F and F2M, it is noted that, overall, independent F2F outperforms independent F2M. However, F2M performs very poorly in novel pixels, and hence F2M may outperform F2F in previously observed regions.

Figure 5A:
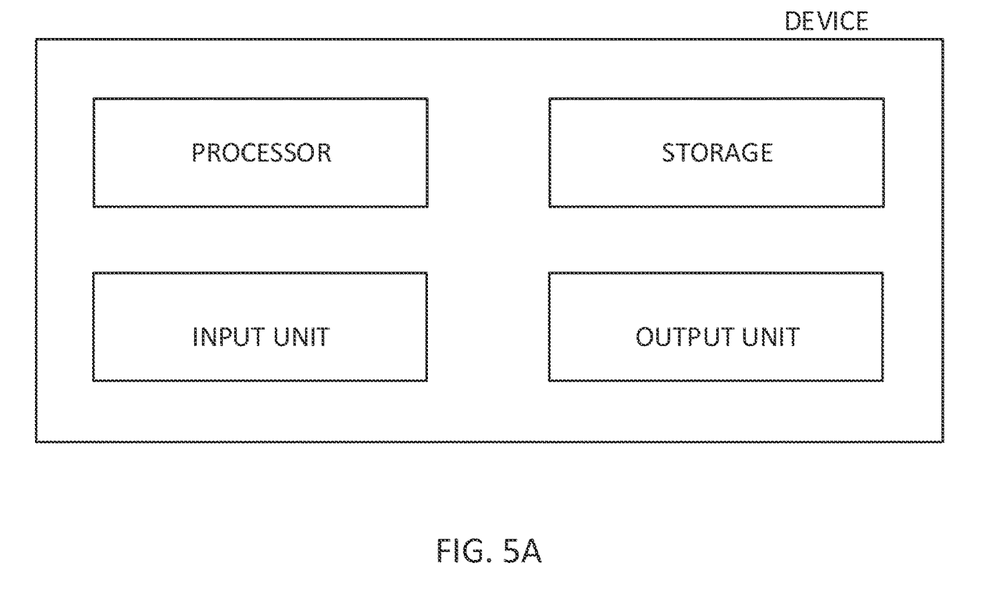
FIG. 5A shows an apparatus configured to employ the forecasting approach according to an embodiment of the present invention.

FIG. 5A shows an apparatus configured to employ any of the forecasting approaches as discussed herein. Such an apparatus may comprise a storage to store data such as input data, processed data, output data and the like. Input data may be the input frames, processed data may be the features after the step of down-sampling by the DN module, the calculated correlations, the forecasted feature, and output data may be the output. The module may further comprise a processor which performs the calculation as described herein. Such a processor may be a Central Processing Unit (CPU) or a Graphics Processing Unit (GPU) or any other unit that is configured to perform the required computational steps. Moreover, the implementation may be based fully on hardware and such a hardware configuration may use a Field Programmable Gate Array (FPGA) or an Application-Specifica Integrated Circuit (ASIC). Further, the module may comprise an input unit for receiving the input as well as an output unit for outputting the output.

Figure 5B:
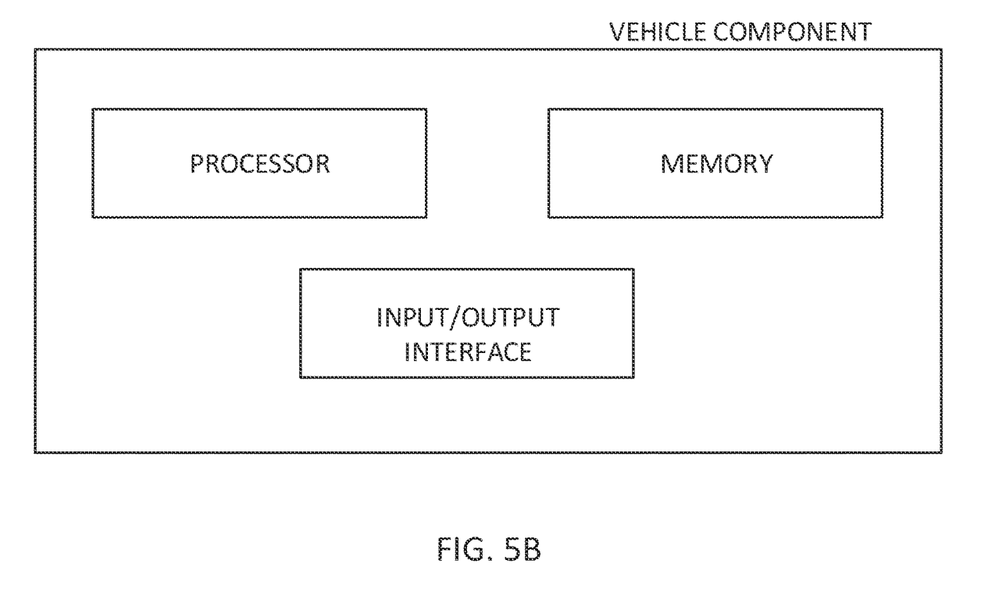
FIG. 5B shows a vehicle component according to an embodiment of the present invention.

FIG. 5B shows a vehicle component according to an embodiment of the present invention. The vehicle component may be provided in a vehicle in order to assist or perform decision making process as described herein. The vehicle component may for example comprise a processor and a memory, the memory having access to instructions that when provided to the processor, cause the processor to simultaneously execute the methods for single-frame prediction and dense semantic forecasting of at least one future frame. The single-frame prediction method comprises the steps of: receiving the input frame from a camera, processing the input frame via a down-sampling module of a neural network to receive the corresponding feature tensor, caching the feature tensor as an input of the forecasting method, and processing the feature tensor via an up-sampling module of the neural network to receive the semantic output. The dense semantic forecasting method comprises the steps of: retrieving a plurality of cached feature tensors, determining spatio-temporal correlations between the plurality of feature tensors, processing the plurality of feature tensors and the spatio-temporal correlations to receive at least one forecasted feature tensor, and processing via an up-sampling module of the neural network the at least one forecasted feature to receive at least one forecasted semantic output for a time larger than the predetermined time. The output of the forecasting method can be used in connection with decision making in autonomous driving of a vehicle as described within this document. Such component would be able to operate in real-time due to very small computational overhead of the forecasting over the method for single-frame prediction.

The vehicle component may comprise a input/output interface which receives the input frames and outputs the semantic representations. The vehicle component may be part of an existing hardware component containing software or may be an additional component. For example, it is possible that an existing hardware component is provided with a software update that allows said existing hardware component to function as the described vehicle component.

FIGS. 6A-D show an overview of the proposed invention.

Figure 6:
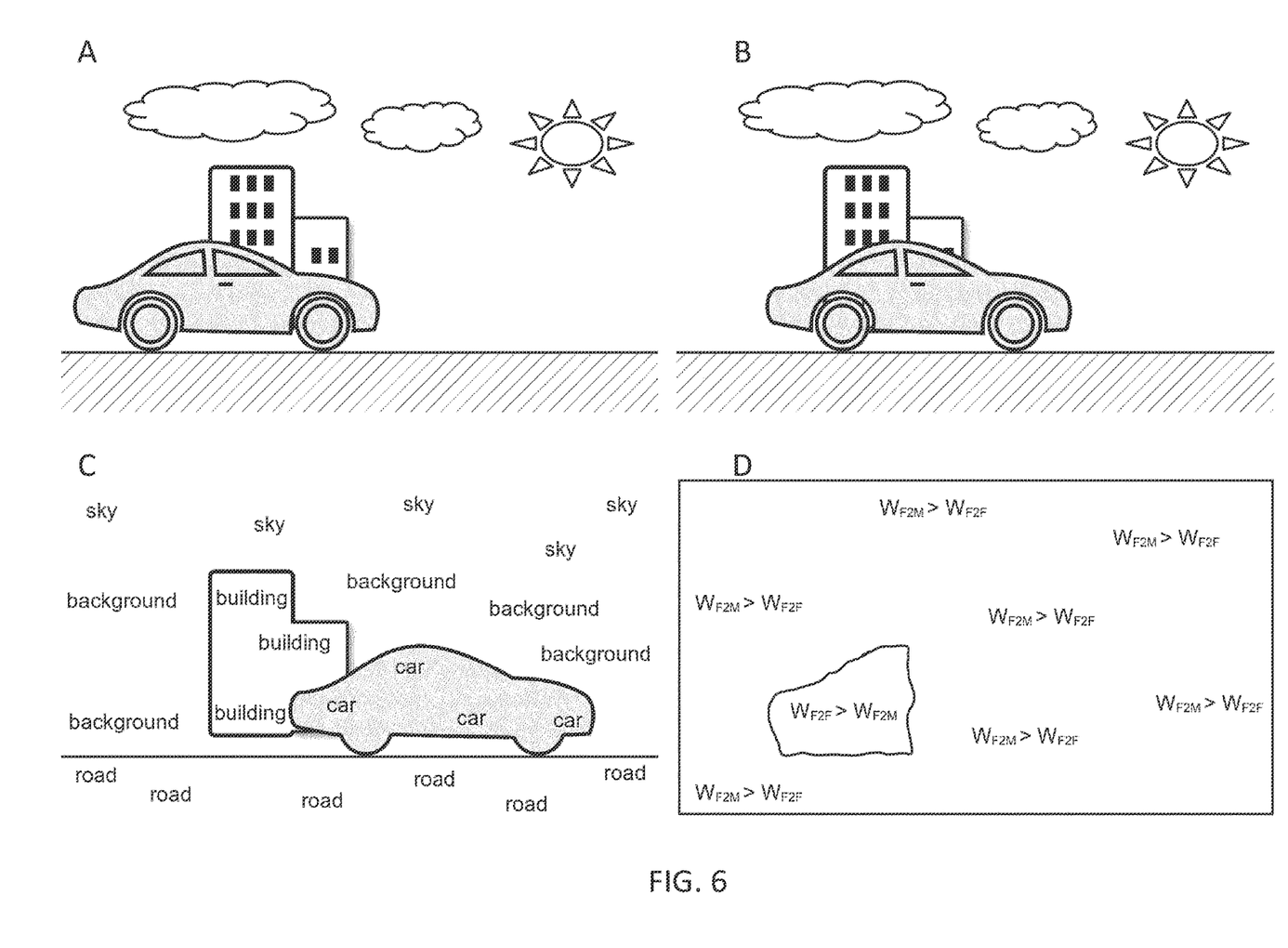
FIG. 6A-D show an overview of the proposed invention. The system receives two input frames on input (Fig. A and Fig. B) and produces a semantic forecast (Fig. C) on output. Our system distinguishes observed parts of the scene where w_F2M>w_F2F from disoccluded and emerging scenery where w_F2M<w_F2F (Fig. D).
Figure 6A:
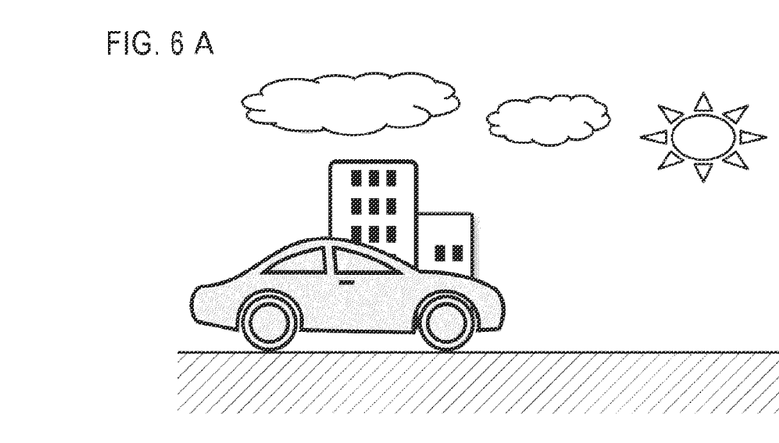
Figure 6B:
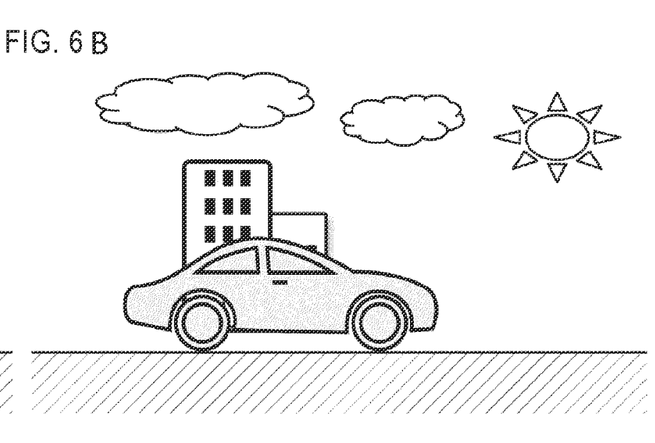

FIGS. 6A and 6B show two input frames received on input. These frames show a typical situation encountered during driving: A car moving across and thus being in front of other elements, e.g. a building. A relevant question for decision making is how to forecast the content behind the car once it passes.

Figure 6C:
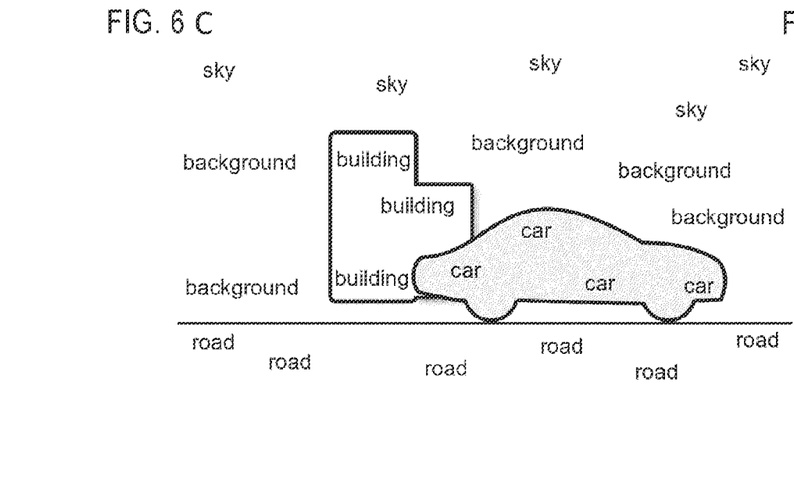

FIG. 6C shows a sematic forecast as on output of the two input frames. As can be seen, the semantic forecast contains elements of the classes road, background, care, building, and sky.

Figure 6D:
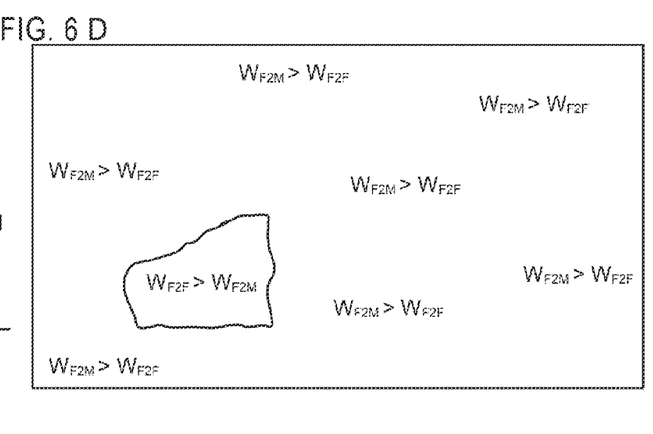

FIG. 6D shows the weights w_F2M and w_F2F in the various distinguishes parts of the scene, in particular shows the parts of the scene where w_F2M>w_F2F from disoccluded and emerging scenery where w_F2M<w_F2F.

In total, the present disclosure discusses a feature-level forecasting approach which regularizes the inference by modeling a causal relationship between the past and the future. The F2M (feature-to-motion) forecasting generalizes better than the F2F (feature-to-feature) approach in many image locations. The best of both approaches is achieved by blending F2M and F2F predictions with densely regressed weight factors. The resulting F2MF model can surpass the state-of-the-art in semantic segmentation forecasting. This approach is also applicable for forecasting other kinds of dense semantic predictions (e.g. instance segmentation and panoptic segmentation). Different from conventional techniques, this forecasting approach is able to distinguish between previously observed parts of the scene and novel scenery.

A particular feature of the present invention is the use of correlation feature tensors for semantic forecasting. These feature tensors bring clear advantage in all three feature-level approaches: F2F, F2M, and F2MF.

Further, two F2M variants with respect to warp direction are discussed herein: F2M with forward warping performs better in setups with small receptive field and allows probabilistic modeling of motion uncertainty; however, F2M with backward warping generalizes equally well in our regular setup.

It is noted that an application of the above discussion of forecasting an output in the process of decision making in autonomous driving of a vehicle. In this application, the above discussed advantages of improved forecasting of an output can directly be transferred to advantages in the process of decision making as better analysis of the acquired images results in better decision making.

Although detailed embodiments have been described, these only serve to provide a better understanding of the invention defined by the independent claims and are not to be seen as limiting.

The invention claimed is:

1. A computer-implemented method of forecasting the semantic output of at least one frame, the method comprising:
  receiving a plurality of input frames from a camera up to a predetermined time;
  processing via a down-sampling module of a neural network the plurality of input frames to receive a plurality of feature tensors;
  determining spatio-temporal correlations between the plurality of feature tensors;
  processing the plurality of feature tensors and the spatio-temporal correlations to receive at least one forecasted feature; and
  processing via an up-sampling module of the neural network the at least one forecasted feature tensor to receive at least one forecasted semantic output for a time larger than the predetermined time;
  wherein in the processing of the plurality of feature tensors and the spatio-temporal correlations to receive the at least one forecasted feature tensor, the at least one forecasted feature tensor is received by direct regression based on the plurality of feature tensors and the spatio-temporal correlations.

2. The method according to claim 1, further comprising:
anticipating at least one anticipated future event occurring after the predetermined time, based on the at least one forecasted semantic output; and
making a decision based on the at least one anticipated future event.

3. The method according to claim 1, wherein in the processing of the plurality of feature tensors to receive the at least one forecasted feature tensor, the at least one forecasted feature tensor is received by warping each of the plurality of feature tensors into a forecasted counterpart to obtain a plurality of forecasted counterparts, and then blending the plurality of forecasted counterparts into the at least one forecasted feature tensor using predetermined weight vectors.

4. The method according to claim 1, wherein in the processing of the plurality of feature tensors to receive the at least one forecasted feature tensor, the at least one forecasted feature tensor is received by:
performing direct regression based on the plurality of feature tensors and the spatio-temporal correlations to receive at least one first auxiliary forecasted feature tensor;
warping each of the plurality of feature tensors into a forecasted counterpart to obtain a plurality of forecasted counterparts, and then blending the plurality of forecasted counterparts into at least one second auxiliary forecasted feature using predetermined weight vectors;
inferring tensor blending weights from the at least one first auxiliary forecasted feature tensor and the at least one second auxiliary forecasted feature tensor; and
blending the at least one first auxiliary forecasted feature tensor and the at least one second auxiliary forecasted feature tensor using the tensor blending weights into the at least one forecasted feature tensor.

5. An apparatus configured for executing the method of claim 1, the apparatus comprising:
the camera;
the down-sampling module;
the up-sampling module; and
a processor.

6. The apparatus according to claim 5, wherein the method further comprises:
anticipating at least one anticipated future event occurring after the predetermined time, based on the at least one forecasted semantic output; and
making a decision based on the at least one anticipated future event.

7. The apparatus according to claim 5, wherein in the processing of the plurality of feature tensors to receive the at least one forecasted feature tensor, the at least one forecasted feature tensor is received by warping each of the plurality of feature tensors into a forecasted counterpart to obtain a plurality of forecasted counterparts, and then blending the plurlaity of forecasted counterparts into the at least one forecasted feature tensor using predetermined weight vectors.

8. The apparatus according to claim 5, wherein in the processing of the plurality of feature tensors to receive the at least one forecasted feature tensor, the at least one forecasted feature tensors is received by:

performing direct regression based on the plurality of features tensors and the spatio-temporal correlations to receive at least one first auxiliary forecasted feature tensor;
warping each of the plurality of features tensors into a forecasted counterpart to obtain a plurality of forecasted counterparts, and then blending the plurality of forecasted counterparts into at least one second auxiliary forecasted feature using predetermined weight vectors;
inferring tensor blending weights from the at least one first auxiliary forecasted feature tensor and the at least one second auxiliary forecasted feature tensor; and
blending the at least one first auxiliary forecasted feature tensor and the at least one second auxiliary forecasted feature tensor using the tensor blending weights into the at least one forecasted feature tensor.

9. A vehicle component, comprising a processor and a memory having access to instruction that, when provided to the processor, causes the processor to execute the method of claim 1.

10. The vehicle component according to claim 9, wherein the method further comprises:
anticipating at least one anticipated future event occurring after the predetermined time, based on the at least one forecasted semantic output; and
making a decision based on the at least one anticipated future event.

11. The vehicle component according to claim 9,
wherein in the processing of the plurality of feature tensors to receive the at least one forecasted feature tensor, the at least one forecasted feature tensor is received by warping each of the plurality of feature tensors into a forecasted counterpart to obtain a plurality of forecasted counterparts, and then blending the plurality of forecasted counterparts into the at least one forecasted feature tensor using predetermined weight vectors.

12. The vehicle component according to claim 9, wherein in the processing of the plurality of feature tensors to receive the at least one forecasted feature, the at least on forecasted feature tensors is received by:
performing direct regression based on the plurality of feature tensors and the spatio-temporal correlations to receive at least one first auxiliary forecasted feature tensor;
warping each of the plurality of feature tensors into a forecasted counterpart to obtain a plurality of forecasted counterparts, and then blending the plurality of forecasted counterparts into at least one second auxiliary forecasted feature using predetermined weight vectors;
inferring tensor blending weights from the at least one first auxiliary forecasted feature tensor and the at least one second auxiliary forecasted feature tensor; and
blending the at least one first auxiliary forecasted feature tensor and the at least one second auxiliary forecasted feature tensor using the tensor blending weights into the at least one forecasted feature tensor.

13. A vehicle component, comprising a processor and a memory having access to instruction that when provided to the processor, causes the processor to simultaneously execute a method for single-frame prediction and a method for dense semantic forecasting of at least one future frame, wherein:

the method for single-frame prediction comprises:
  receiving the input frame from a camera up to a predetermined time,
  processing the input frame via a down-sampling module of a neural network to receive a corresponding feature tensor, and
  caching the feature tensors for later use, and processing the corresponding feature tensor via an up-sampling module of the neural network to receive the semantic output; and
the method for dense semantic forecasting comprises of:
  retrieving a plurality of cached feature tensors up to the predetermined time,
  determining spatio-temporal correlations between the plurality of feature tensors,
  processing the plurality of cached feature tensors and the spatio-temporal correlations to receive at least one forecasted feature tensor, and
  processing via an up-sampling module of the neural network the at least one forecasted feature tensor to receive at least one forecasted semantic output for a time larger than the predetermined time;
wherein the processing of the plurality of cached feature tensors and the spatio-temporal correlations to receive the at least one forecasted feature tensor, the at least one forecasted feature tensor is received by direct regression based on the plurality of cached feature tensors and the spatio-temporal correlations.

* * * * *